(12) United States Patent
Wang et al.

(10) Patent No.: US 12,744,705 B2
(45) Date of Patent: Sep. 22, 2026

(54) LOGGENIE: TRANSFORMER-BASED AIOPS SOLUTION FOR CROSS-DOMAIN LOG ANOMALY DETECTION

(71) Applicant: Dell Products L.P., Round Rock, TX (US)

(72) Inventors: Zijia Wang, London (GB); Mustafa Albado, Cork (IE); Min Gong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 42 days.

(21) Appl. No.: 19/037,507

(22) Filed: Jan. 27, 2025

(65) Prior Publication Data

US 2026/0222282 A1 Jul. 30, 2026

(51) Int. Cl.

| | |
|---|---|
| ***H04L 9/40*** | (2022.01) |
| ***G06F 40/30*** | (2020.01) |
| ***G06N 3/0455*** | (2023.01) |
| ***H04L 41/069*** | (2022.01) |

(52) U.S. Cl.

CPC ............ *H04L 41/069* (2013.01); *G06F 40/30* (2020.01); *G06N 3/0455* (2023.01)

(58) Field of Classification Search

CPC ..... H04L 41/069; H04L 9/40; H04L 63/1425; H04L 14/1441; G06F 40/30; G06N 3/0455

USPC .......................................................... 709/224

See application file for complete search history.

(56) References Cited

U.S. PATENT DOCUMENTS

2025/0247409 A1* 7/2025 Liu ..................... H04L 63/1425

* cited by examiner

*Primary Examiner* — Jude Jean Gilles

(74) *Attorney, Agent, or Firm* — Krishnendu Gupta; Lesley Leonessa

(57) ABSTRACT

Methods, system, and non-transitory processor-readable storage medium for a log anomaly detection system are provided herein. An example method includes receiving, by a log anomaly detection system, log event sequences from a source domain. The log anomaly detection system pretrains a model to learn common patterns and semantics from the source domain log sequences. The log anomaly detection system implements a Log-Attention Module to address information loss that occurs during log parsing. The log anomaly detection system performs adapter-based fine-tuning on the pretrained model using target domain log sequences. The log anomaly detection system detects anomalies in the target domain log sequences using the fine-tuned model.

20 Claims, 9 Drawing Sheets

LOGGENIE: TRANSFORMER-BASED AIOPS SOLUTION FOR CROSS-DOMAIN LOG ANOMALY DETECTION

FIELD

The field relates generally to detecting anomalies within log sequences, within information processing systems.

BACKGROUND

Log anomaly detection has been a critical area of research in IT operations, with various approaches proposed to address the challenges of domain-specific retraining and generalization across different log domains.

SUMMARY

Illustrative embodiments provide techniques for implementing a log anomaly detection system in a storage system. For example, illustrative embodiments comprise the log anomaly detection system receiving log event sequences from a source domain. The log anomaly detection system pretrains a model to learn common patterns and semantics from the source domain log sequences. The log anomaly detection system implements a Log-Attention Module to address information loss that occurs during log parsing, and performs adapter-based fine-tuning on the pretrained model using target domain log sequences. The log anomaly detection system detects anomalies in the target domain log sequences using the fine-tuned model. Other types of processing devices can be used in other embodiments. These and other illustrative embodiments include, without limitation, apparatus, systems, methods and processor-readable storage media.

DETAILED DESCRIPTION

Figure 1:
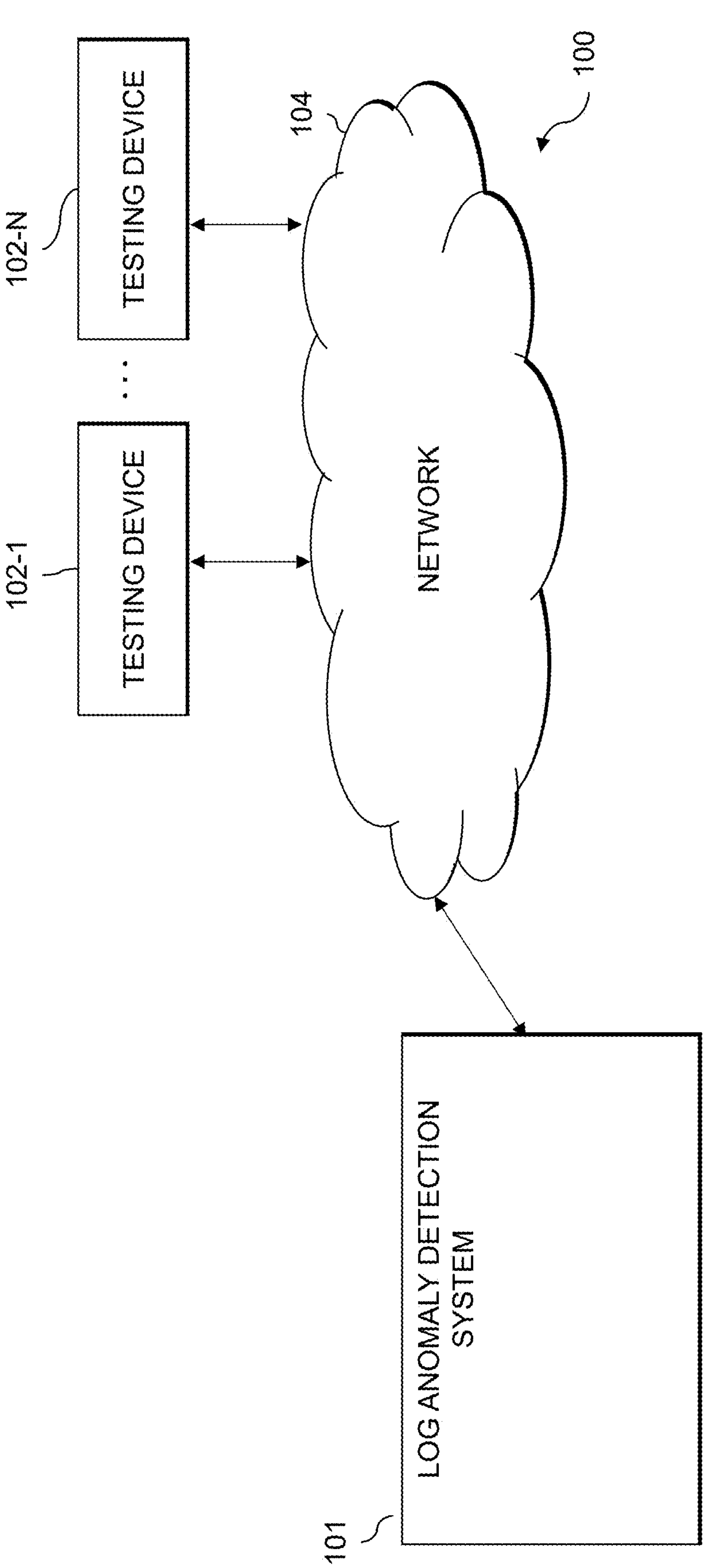
FIG. 1 shows an information processing system including a log anomaly detection system, in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a log anomaly detection system, which technique may be used to detect log anomalies across diverse log domains. The log anomaly detection system receives log event sequences from a source domain. The log anomaly detection system pretrains a model to learn common patterns and semantics from the source domain log sequences. The log anomaly detection system implements a Log-Attention Module to address information loss that occurs during log parsing, and performs adapter-based fine-tuning on the pretrained model using target domain log sequences. The log anomaly detection system detects anomalies in the target domain log sequences using the fine-tuned model. Other types of processing devices can be used in other embodiments. These and other illustrative embodiments include, without limitation, apparatus, systems, methods and processor-readable storage media.

Conventional technologies fail to provide a unified framework for cross-domain generalization. Conventional technologies require domain-specific retraining and are not able to generalize effectively across different log domains. Conventional technologies fail to provide a unified framework that combines pretraining and adapter-based tuning specifically tailored for log anomaly detection. Conventional technologies require extensive retraining for each new log domain. Conventional technologies fail to leverage a pretraining model and adapt it to new domains with minimal additional parameters. Conventional technologies fail to enhance generalization across diverse log environments. Conventional technologies fail to provide a Log-Attention module that supplements information lost during log parsing by integrating parameter and keyword information into the self-attention mechanism of the Transformer encoder. Conventional technologies rely solely on raw log sequences or basic parsing techniques. Conventional technologies that rely on statistical techniques or basic machine learning models do not effectively capture the full context of log events. Conventional technologies fail to provide parameter efficiency through Adapter-based tuning. Conventional technologies require full model retraining which is computationally expensive and time-consuming. Conventional technologies struggle with scalability and often face performance degradation in large-scale heterogeneous IT environments. Conventional technologies require substantial computations resources for training and inference. CT do not address the loss of critical information that occurs using traditional parsing techniques. Conventional technologies require models and extensive retraining across multiple data centers, leading to high operational costs and inefficiencies.

By contrast, in at least some implementations in accordance with the current technique as described herein, the detection of log anomalies across divers log domains is achieved by a log anomaly detection system that receives log event sequences from a source domain. The log anomaly detection system pretrains a model to learn common patterns and semantics from the source domain log sequences. The log anomaly detection system implements a Log-Attention Module to address information loss that occurs during log parsing, and performs adapter-based fine-tuning on the pretrained model using target domain log sequences. The log anomaly detection system detects anomalies in the target domain log sequences using the fine-tuned model. Other types of processing devices can be used in other embodiments. These and other illustrative embodiments include, without limitation, apparatus, systems, methods and processor-readable storage media.

Thus, a goal of the current technique is to provide a method and a system for a log anomaly detection system that can be used on log sequences across multiple cross domains. Another goal is to have a unified framework for cross-domain generalization. Another goal is to provide a unified framework that combines pretraining and adapter-based tuning specifically tailored for log anomaly detection. Another goal is to leverage a pretraining model and adapt it to new domains with minimal additional parameters. Another goal is to enhance generalization across diverse log environments. Another goal is to provide a Log-Attention module that supplements information lost during log parsing by integrating parameter and keyword information into the self-attention mechanism of the Transformer encoder. Yet another goal is to provide parameter efficiency through Adapter-based tuning.

In at least some implementations in accordance with the current technique described herein, the use of a log anomaly detection system can provide one or more of the following advantages: provides a self-attention mechanism of the Transformer encoder that enhances the representation of log data, provides an adapter-based tuning mechanism that significantly reduces the number of trainable parameters needed for domain adaptation, fine-tunes only the adapter layers to ensure efficient adaptation to new domains with lower computational overhead, provides a scalable and efficient solution for log anomaly detection that demonstrates practical applicability and stability in industrial scenarios with high log volume and diversity, provides a Log-Attention module that captures the full context of log events by integrating parameter and keyword information into the Transformer encoded, enhancing the model's ability to understand and utilize log data, provides an adapter-based tuning mechanism that significantly reduces the number of trainable parameters, making it more suitable for deployment in low-resource settings and scalable for large-scale IT environments, provides strong generalization capabilities across different log domains, reducing the need for extensive retraining, provides improved log anomaly detection with fewer trainable parameters and lower training costs, and quickly adapts to the local log format and characteristics with minimal additional training, reducing the computational and time resources required and improving the accuracy and robustness of anomaly detection across different data centers while providing faster deployment.

In contrast to conventional technologies, in at least some implementations in accordance with the current technique as described herein, the detection of log anomalies across diverse log domains is achieved by a log anomaly detection system that receives log event sequences from a source domain. The log anomaly detection system pretrains a model to learn common patterns and semantics from the source domain log sequences. The log anomaly detection system implements a Log-Attention Module to address information loss that occurs during log parsing, and performs adapter-based fine-tuning on the pretrained model using target domain log sequences. The log anomaly detection system detects anomalies in the target domain log sequences using the fine-tuned model.

In an example embodiment of the current technique, the log anomaly detection system extracts features from the source domain log sequences using a pretrained language model.

In an example embodiment of the current technique, the log anomaly detection system pretrains the model using a plurality of domain log sequences.

In an example embodiment of the current technique, the log anomaly detection system acquires shared semantic knowledge from the source domain.

In an example embodiment of the current technique, the log anomaly detection system processes log event sequences through a feature extractor prior to the pretraining.

In an example embodiment of the current technique, the log anomaly detection system uses neural network models to capture semantic information within log sequences.

In an example embodiment of the current technique, the log anomaly detection system integrates parameter and keyword information into a Transformer encoder, and applies a Log-Attention mechanism that introduces a bias term to capture additional context from log parameters and keywords.

In an example embodiment of the current technique, the Log-Attention mechanism is defined by the equation: $\mathrm{LogAttention}(Q,K,V,b)=\mathrm{softmax}((QK^T+b)/\sqrt{d_k})V$, where Q, K, and V are query, key, and value matrices respectively, and b is the bias term.

In an example embodiment of the current technique, the bias term is derived from parameter and keyword information present in the log data.

In an example embodiment of the current technique, the bias term is derived from a neural network.

In an example embodiment of the current technique, the bias term is a randomized number.

In an example embodiment of the current technique, the log anomaly detection system supplements information lost during log parsing by integrating the parameter and keyword information into the Transformer encoder.

In an example embodiment of the current technique, the log anomaly detection system receives log event sequences from a target domain, processes the target domain sequences through an adapter layer, and fine-tunes the pretrained model using the adapter layer to adapt to the target domain while minimizing additional parameters.

In an example embodiment of the current technique, the adapter layer comprises lightweight layers added alongside main Transformer encoder layers.

In an example embodiment of the current technique, the log anomaly detection system extracts features from the target domain in a similar fashion as the source domain, additionally including the adapter layer.

In an example embodiment of the current technique, the log anomaly detection system implements an adapter mechanism defined by: Adapter(x)=LayerNorm(x+FeedForward(x)), where x is an input to the adapter.

In an example embodiment of the current technique, the log anomaly detection system analyzes log sequences using the Log-Attention mechanism to identify irregular patterns.

In an example embodiment of the current technique, the log anomaly detection system utilizes both the Log-Attention mechanism and adapter-based features to identify irregular patterns in the target domain.

In an example embodiment of the current technique, the log anomaly detection system captures sequential information of log events through a parallel adapter structure within the Log-Attention layer.

FIG. 1 shows a computer network (also referred to herein as an information processing system) 100 configured in accordance with an illustrative embodiment. The computer network 100 comprises a log anomaly detection system 101, and testing devices 102-N. The log anomaly detection system 101, code generation system 105, and testing devices 102-N are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. The log anomaly detection system 101 may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the log anomaly detection system 101, and computing devices 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The log anomaly detection system 101, and testing devices 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the log anomaly detection system 101 are one or more input-output devices, which illustratively comprise keyboards, displays or other types of input-output devices in any combination. Such input-output devices can be used, for example, to support one or more user interfaces to the log anomaly detection system 101, as well as to support communication between the log anomaly detection system 101 and other related systems and devices not explicitly shown. For example, a dashboard may be provided for a user to view results produced by the log anomaly detection system 101. One or more input-output devices may also be associated with any of the log anomaly detection system 101, and testing devices 102-N.

Additionally, the log anomaly detection system 101 in the FIG. 1 embodiment is assumed to be implemented using at least one processing device. Each such processing device generally comprises at least one processor and an associated memory, and implements one or more functional modules for controlling certain features of the log anomaly detection system 101.

More particularly, the log anomaly detection system 101 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the log anomaly detection system 101 to communicate over the network 104 with the log anomaly detection system 101, and testing devices 102-N and illustratively comprises one or more conventional transceivers.

A log anomaly detection system 101 may be implemented at least in part in the form of software that is stored in memory and executed by a processor, and may reside in any processing device. The log anomaly detection system 101 may be a standalone plugin that may be included within a processing device.

It is to be understood that the particular set of elements shown in FIG. 1 for log anomaly detection system 101 involving the log anomaly detection system 101, and testing devices 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the log anomaly detection system 101 can be on and/or part of the same processing platform.

An exemplary process of log anomaly detection system 101 in computer network 100 will be described in more detail with reference to, for example, the flow diagram of FIG. 2.

Figure 2:
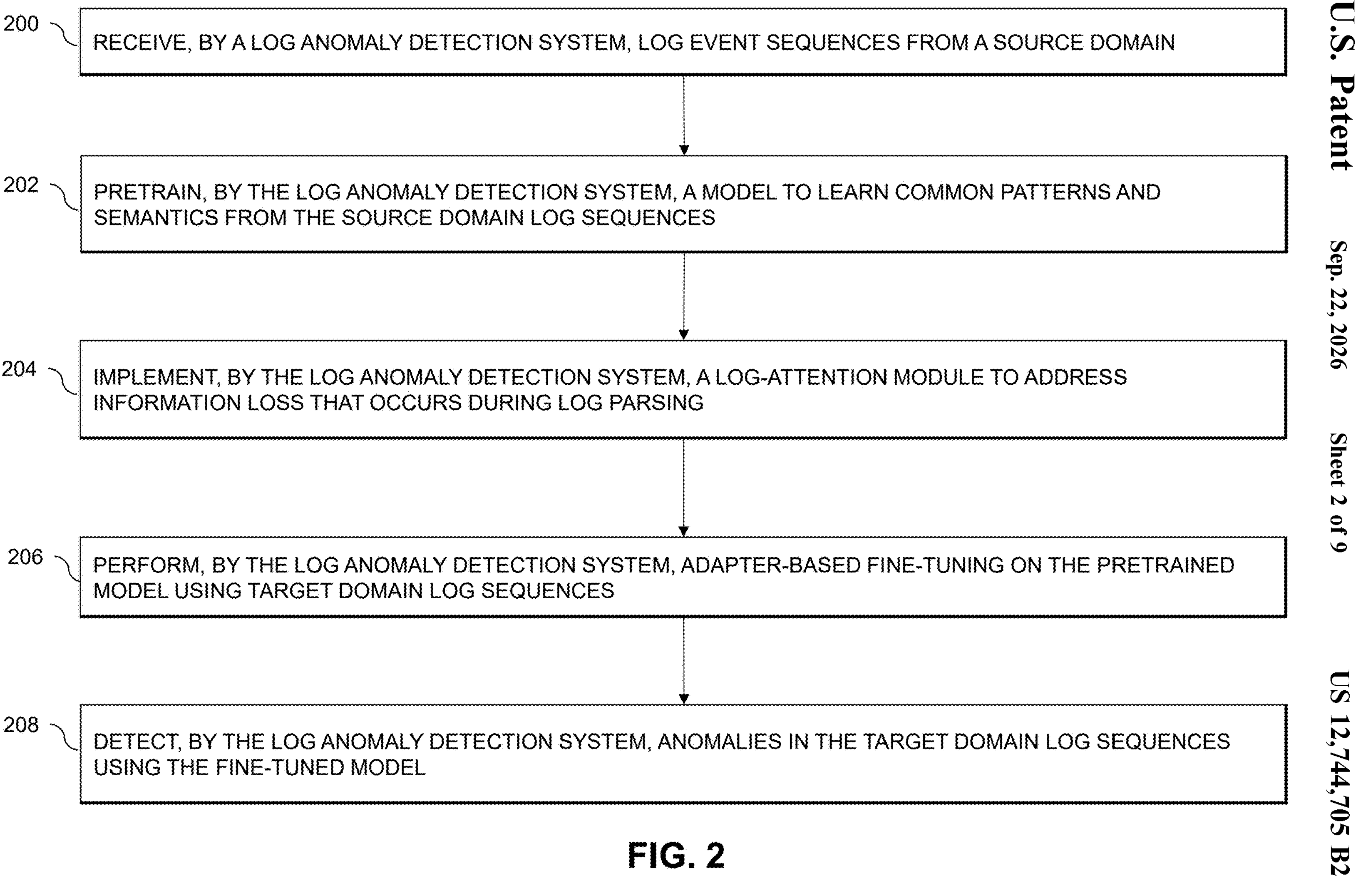
FIG. 2 shows a flow diagram of a process for a log anomaly detection system, in an illustrative embodiment.

FIG. 2 is a flow diagram of a process for execution of the log anomaly detection system 101 in an illustrative embodiment. It is to be understood that this particular process is only an example, and additional or alternative processes can be carried out in other embodiments.

At 200, the log anomaly detection system 101 receives log event sequences from a source domain. In an example embodiment, the log anomaly detection system 101 receives log event sequences from more than one source domain.

Figure 3:
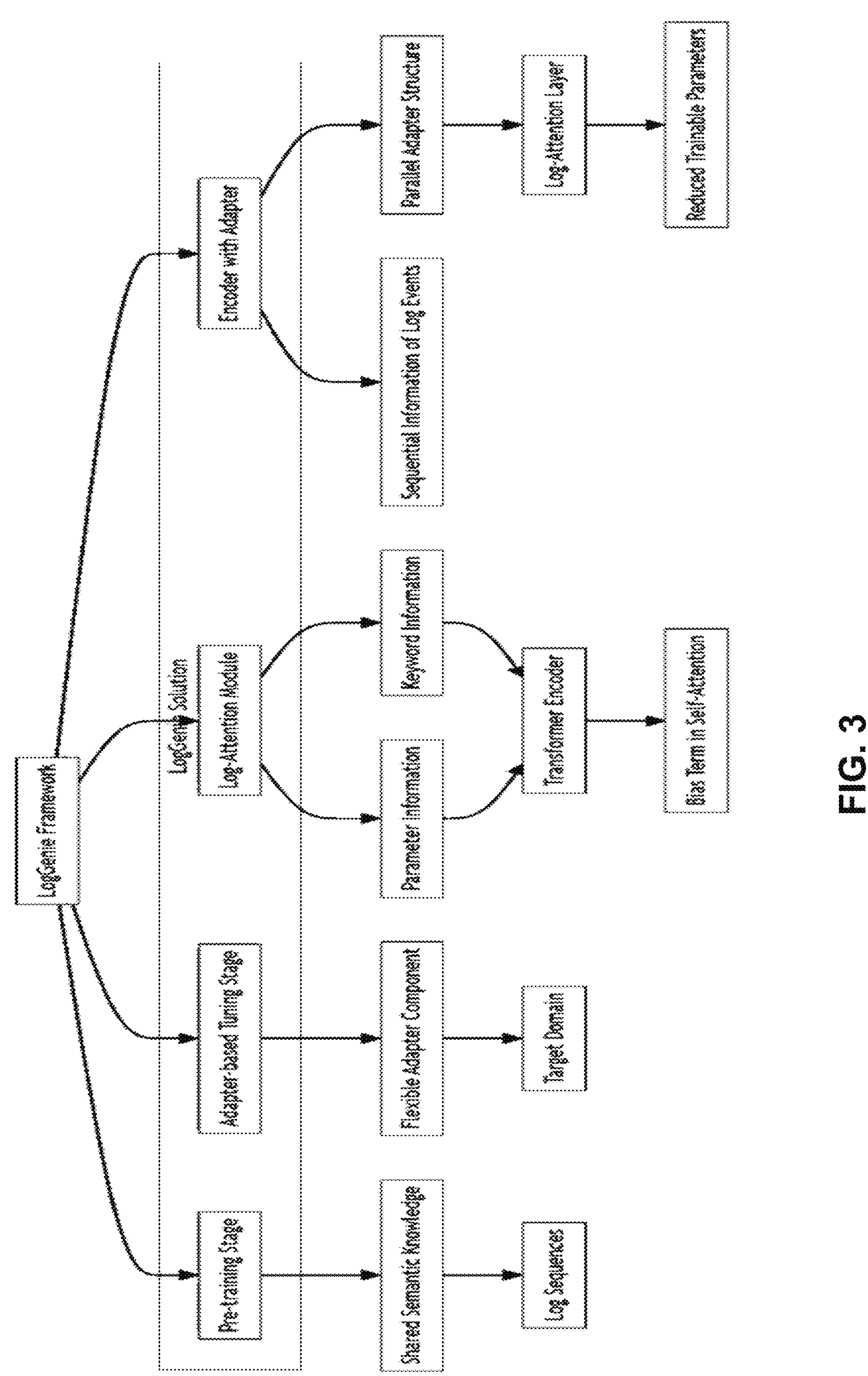
FIG. 3 illustrates the log anomaly detection system framework, in an illustrative embodiment.

At 202 the log anomaly detection system 101 pretrains a model to learn common patterns and semantics from the source domain log sequences. FIG. 3 illustrates the log anomaly detection system 101 framework, titled LogGenie framework comprising a pretraining stage that pretrains the model using log event sequences from at least one source domain, for example test device 102-1. The log anomaly detection system 101 framework illustrates the relationships between the primary modules; Pretraining Stage, Adapter-based Tuning Stage, Log-Attention Module, and Encoder with Adapter. Each module contributes to the overall efficiency of the log anomaly detection system 101 and the capability of the log anomaly detection system 101. The log anomaly detection system 101 framework highlights the flow of semantic knowledge acquisition, domain adaptation, and sequential information processing.

In an example embodiment, the log anomaly detection system 101 extracts features from the source domain log sequences using a pretrained language model. In an example embodiment, the log anomaly detection system 101 pretrains the model using a plurality of domain log sequences. In an example embodiment, the log anomaly detection system 101 acquires shared semantic knowledge from the source domain (or multiple source domains).

Figure 4:
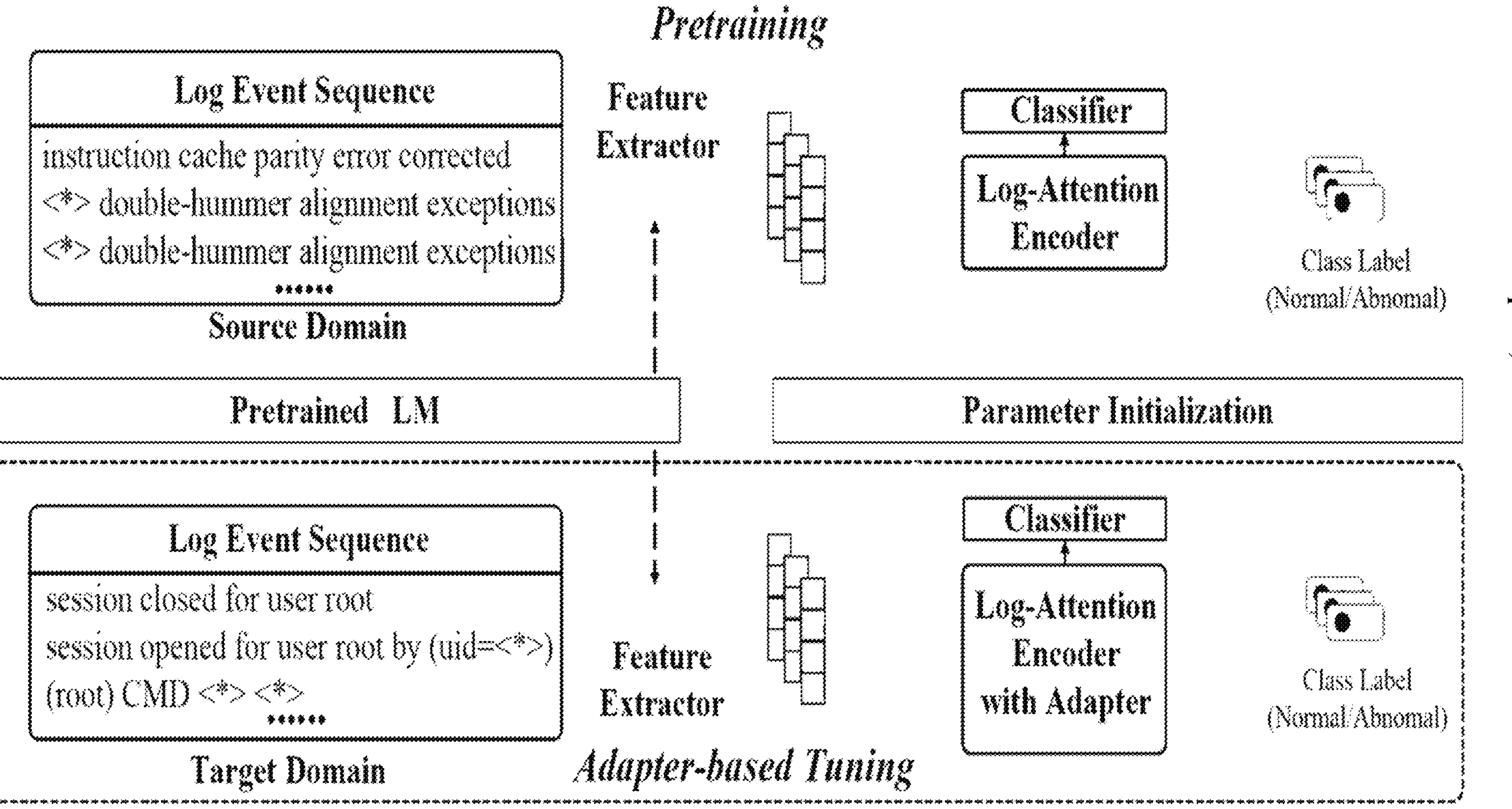
FIG. 4 illustrates the architecture of the log anomaly detection system, in an illustrative embodiment.

In an example embodiment, the log anomaly detection system 101 processes the domain log sequence(s) through a feature extractor prior to the pretraining. FIG. 4 illustrates the architecture of the log anomaly detection system 101 comprising the feature extractor in both the pretraining step and the adapter-based tuning step. In an example embodiment, the log anomaly detection system 101 comprises two main stages, the pretraining stage where pretraining is performed on source domain log sequences and an adapter-based tuning stage for target domains. In the pretraining stage, features are extracted from source domain logs and processed through a pre-trained language model and a Log-Attention Encoder to classify log events. In the adapter-based tuning stage, the pre-trained model is fine-tuned with target domain logs using an adapter layer, enabling efficient domain adaptation with minimal additional parameters. In an example embodiment, the target domain logs are received from test device 102-N.

In an example embodiment, the feature extractor uses neural network models to capture semantic information within log sequences. In the feature extraction stage, log event sequences from the source domain(s) are processed to extract features. The feature extraction is performed using a neural network model, such as a pretrained language model (LM). The objective is to capture the semantic information within the log sequences.

Figure 5:
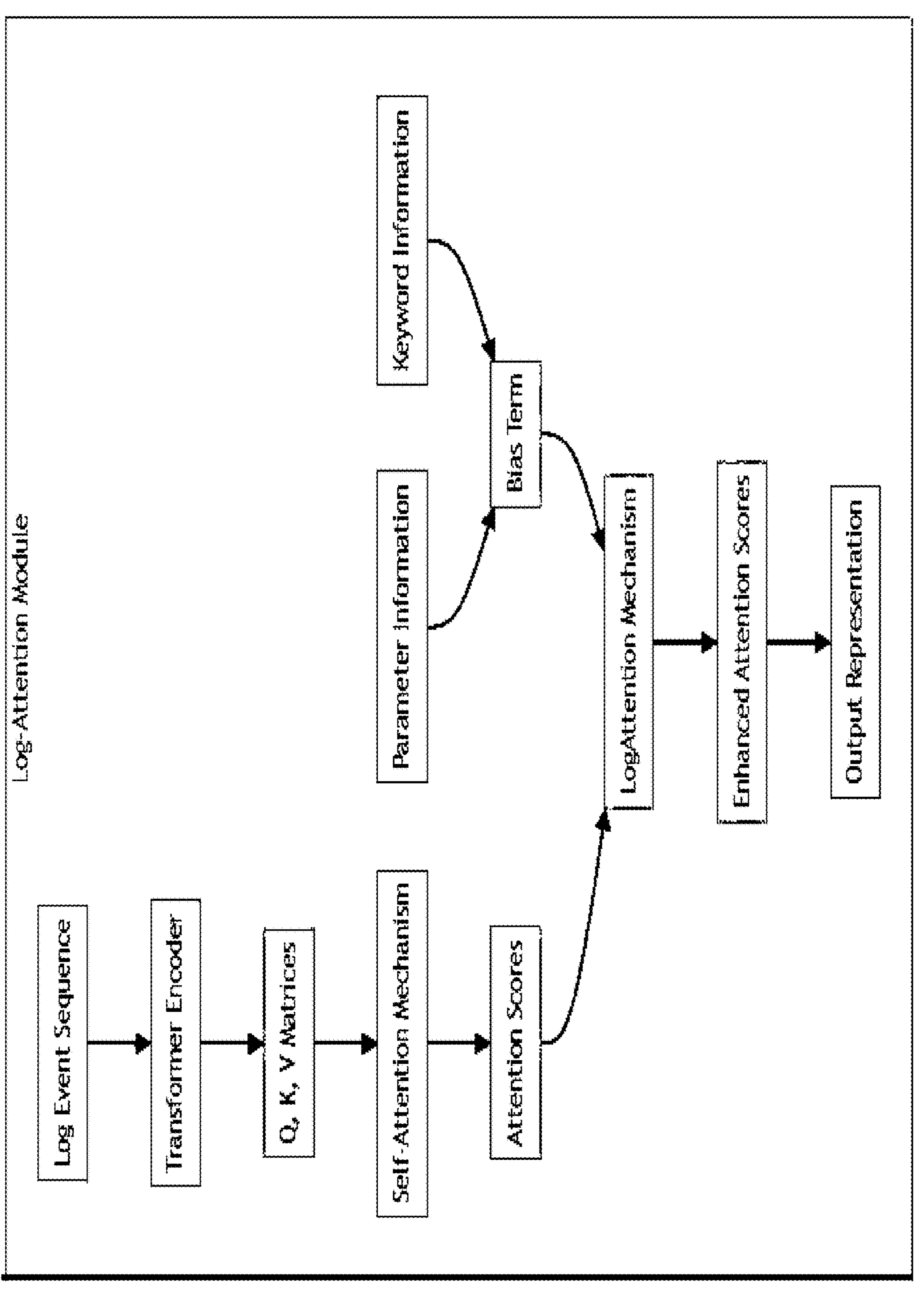
FIG. 5 illustrates the flow of the Log-Attention Module, in an illustrative embodiment.

At 204 the log anomaly detection system 101 implements a Log-Attention Module to address information loss that occurs during log parsing. FIG. 5 illustrates the flow of the Log-Attention Module. FIG. 5 illustrates how parameter and keyword information are integrated into the Transformer encoder to produce enhanced attention scores and improve the representation of log sequences. In an example embodiment, the log anomaly detection system 101 supplements the information lost during log parsing by integrating the parameter and keyword information into the Transformer encoder to enhance the model's ability to capture and utilize the contextual information of log events. The Log-Attention module integrates parameter and keyword information into the Transformer encoder, which supplements the self-attention mechanism with additional context. In an example embodiment, the self-attention mechanism in a Transformer model is described by the following equation, where Q, K, and V are the query, key and value matrices, and $d_k$ is the dimension of the keys:

$$\text{Attention}(Q, K, V) = \text{softmax}\left(\frac{QK^T}{\sqrt{d_k}}\right)V$$

In an example embodiment, the log anomaly detection system 101 applies a Log-Attention mechanism that introduces a bias term to capture additional context from log parameters and keywords. The Log-Attention mechanism is described by the equation below, where Q, K, and V are query, key, and value matrices respectively, and b is the bias term:

$$\text{LogAttention}(Q, K, V, B) = \text{softmax}\left(\frac{QK^T + b}{\sqrt{d_k}}\right)V$$

The Log-Attention mechanism introduces the bias term, b, that captures additional context from log parameters and keywords. In an example embodiment, the bias term is derived from parameter and keyword information present in the log data which helps in providing a more comprehensive representation of the log sequences. In another example embodiment, the bias term is derived from a neural network. In yet another example embodiment, the bias term is a randomized number.

At 206 the log anomaly detection system 101 performs adapter-based fine-tuning on the pretrained model using target domain log sequences. In an example embodiment, the adapter-based tuning stage efficiently transfers the knowledge obtained from the source domain to the target domain. This stage involves fine-tuning the pretrained model on target domain log data using a flexible adapter component. The source domain and the target domain may be different, for example, a cloud infrastructure environment, a financial services environment, and/or security logs from an enterprise IT environment. For example, the model may be pretrained on the cloud infrastructure log sequences and then applied to either the financial services log sequences or the security log sequences from the enterprise IT environment.

Figure 7:
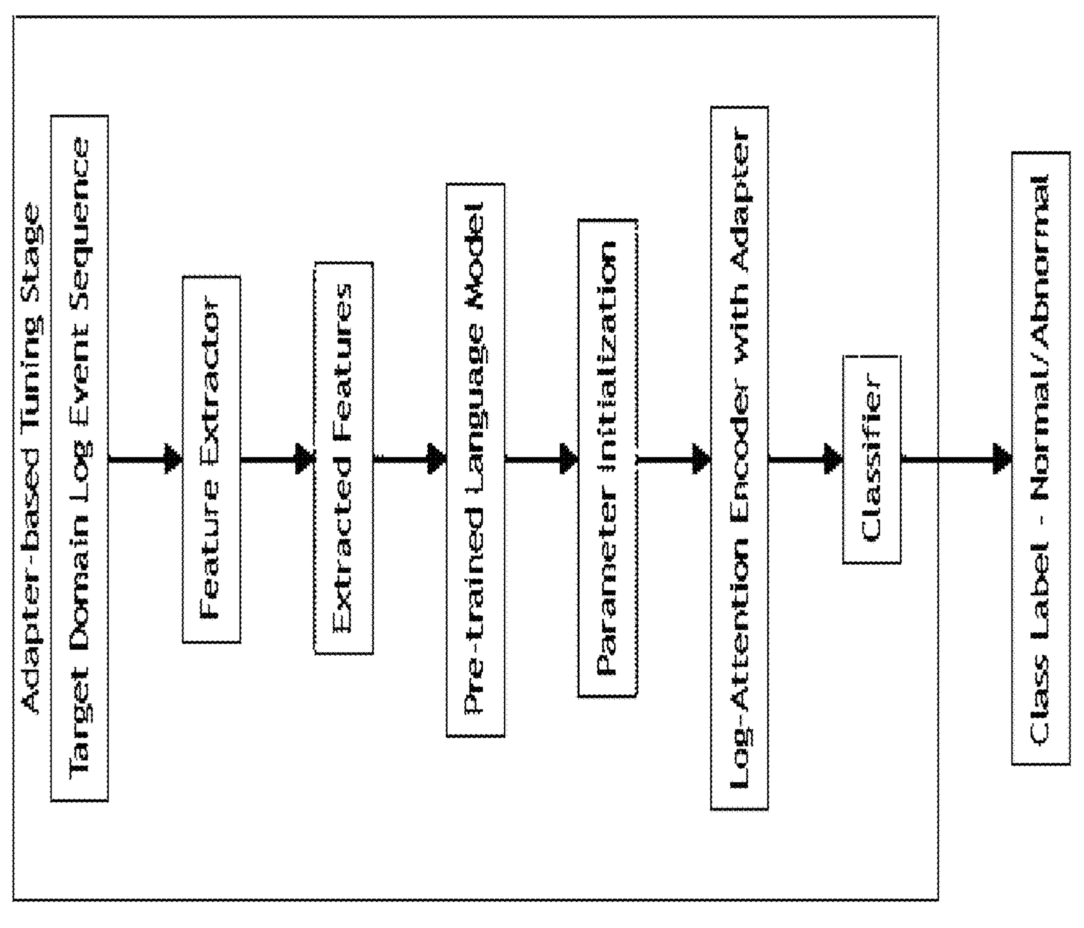
FIG. 7 illustrates the Adapter-based Tuning Stage, in an illustrative embodiment.

In an example embodiment, the log anomaly detection system 101 receives log event sequences from a target domain. In an example embodiment, the log anomaly detection system 101 processes the target domain sequences through an adapter layer. In an example embodiment, the adapter layer comprises lightweight layers added alongside main Transformer encoder layers. In an example embodiment, the log anomaly detection system 101 processes the target domain sequences in the feature extraction and adaptation stage as illustrated in FIG. 4. The log anomaly detection system 101 processes the log event sequences from the target domain similarly to the pretraining stage of the log event sequences from the source domain, but with the addition of an adapter layer to fine-tune the model with minimal additional parameters. FIG. 7 illustrates the Adapter-based Tuning Stage. FIG. 7 shows the flow of the adapter-based tuning stage in the log anomaly detection system 101 framework, illustrating the adaptation of the pretrained model to target domain log sequences with the addition of an adapter layer for efficient domain adaptation.

Figure 6:
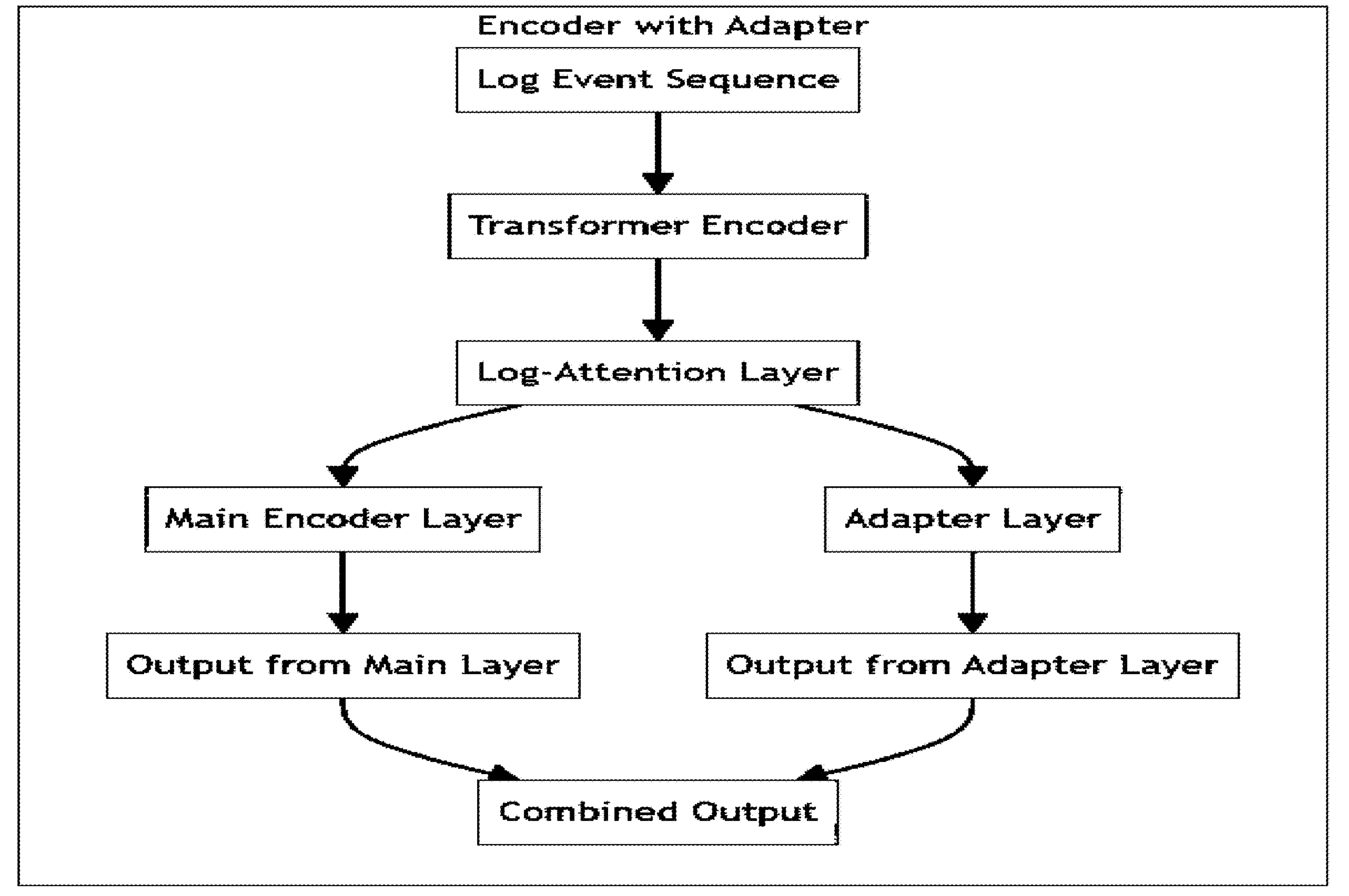
FIG. 6 illustrates the adapter mechanism, in an illustrative embodiment.

In an example embodiment, the Encoder with Adapter is designed to capture and utilize the sequential information of log events while reducing the number of trainable parameters. This is achieved through a parallel adapter structure inserted in the Log-Attention layer. In an example embodiment, the parallel adapter structure comprises lightweight layers that are added alongside the main Transformer encoder layers. These adapters allow the model to fine tune on new domains with minimal additional parameters, ensuring efficient domain adaptation. FIG. 6 illustrates the adapter mechanism. FIG. 6 shows a diagram of the Encoder with Adapter, showing the parallel adapter structure that allows for efficient fine tuning on new domains with minimal additional parameters.

The objective of the adapter-based tuning is to minimize the number of trainable parameters while maintaining high performance in the target domain. In an example embodiment, the log anomaly detection system 101 implements an adapter mechanism defined by: Adapter(x)=LayerNorm(x+FeedForward(x)), where x is an input to the adapter and FeedForward is a lightweight feedforward neural network.

At 208 the log anomaly detection system 101 detects anomalies in the target domain log sequences using the fine-tuned model. In an example embodiment, the log anomaly detection system 101 utilizes both a Log-Attention mechanism and adapter-based features to identify irregular patterns in the target domain. In an example embodiment, the log anomaly detection system 101 analyzes log sequences using the Log-Attention mechanism to identify irregular patterns.

The above-described illustrative embodiments provide significant advantages relative to conventional approaches. For example, some embodiments are configured to significantly optimize the log sequence anomaly detection by providing a scalable and efficient solution for log anomaly detection that demonstrates practical applicability and stability in industrial scenarios with high log volume and diversity. These and other embodiments can effectively improve the experience of users interacting with data sets in databases. Embodiments disclosed herein provide a self-attention mechanism of the Transformer encoder to enhance the representation of log data. Embodiments disclosed herein provide an adapter-based tuning mechanism that significantly reduces the number of trainable parameters needed for domain adaptation. Embodiments disclosed herein fine-tune only the adapter layers to ensure efficient adaptation to new domains with lower computational overhead. Embodiments disclosed herein provide a Log-Attention module that captures the full context of log events by integrating parameter and keyword information into the Transformer encoded, enhancing the model's ability to understand and utilize log data. Embodiments disclosed herein provide an adapter-based tuning mechanism that significantly reduces the number of trainable parameters, making it more suitable for deployment in low-resource settings and scalable for large-scale IT environments. Embodiments disclosed herein provide strong generalization capabilities across different log domains, reducing the need for extensive retraining. Embodiments disclosed herein provide improved log anomaly detection with fewer trainable parameters and lower training costs. Embodiments disclosed herein quickly adapt to the local log format and characteristics with minimal additional training, reducing the computational and time resources required and improving the accuracy and robustness of anomaly detection across different data centers while providing faster deployment.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of the information processing system 100, these platforms may also be used to implement at least portions of other information processing systems in other embodiments.

Figure 8:
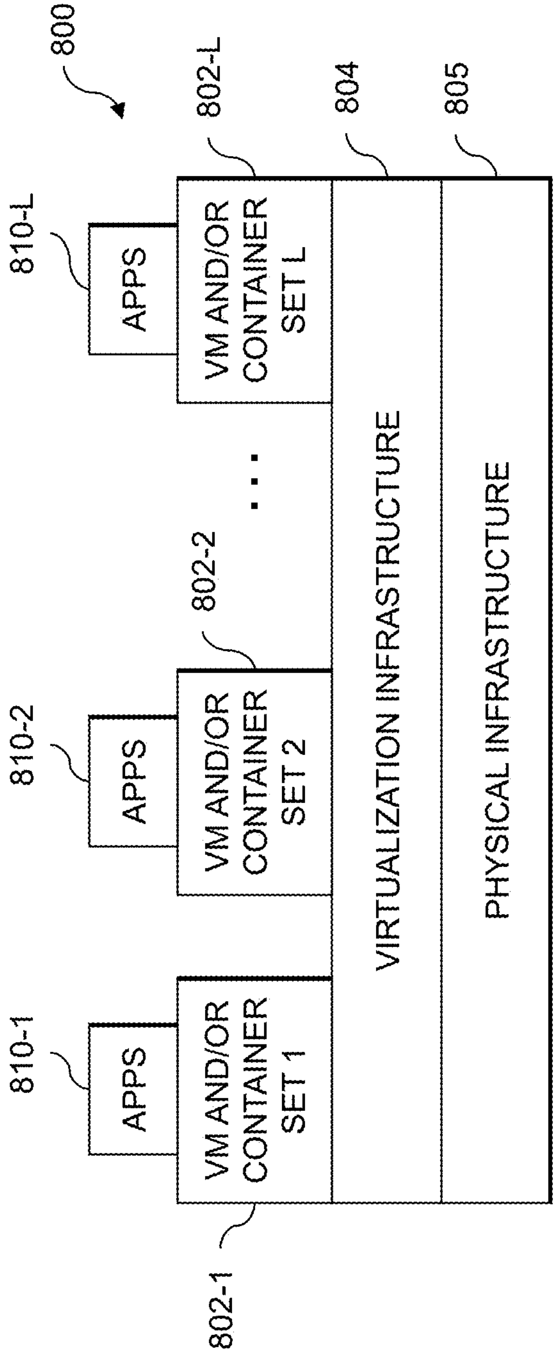
FIGS. 8 and 9 show examples of processing platforms that may be utilized to implement at least a portion of a log anomaly detection system embodiments.

FIG. 8 shows an example processing platform comprising cloud infrastructure 800. The cloud infrastructure 800 comprises a combination of physical and virtual processing resources that are utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 comprise respective VMs, respective sets of one or more containers, or respective sets of one or more containers running in VMs. In some implementations of the FIG. 8 embodiment, the VMs/container sets 802 comprise respective VMs implemented using virtualization infrastructure 804 that comprises at least one hypervisor.

A hypervisor platform may be used to implement a hypervisor within the virtualization infrastructure 804, where the hypervisor platform has an associated virtual infrastructure management system. The underlying physical machines comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

Figure 9:
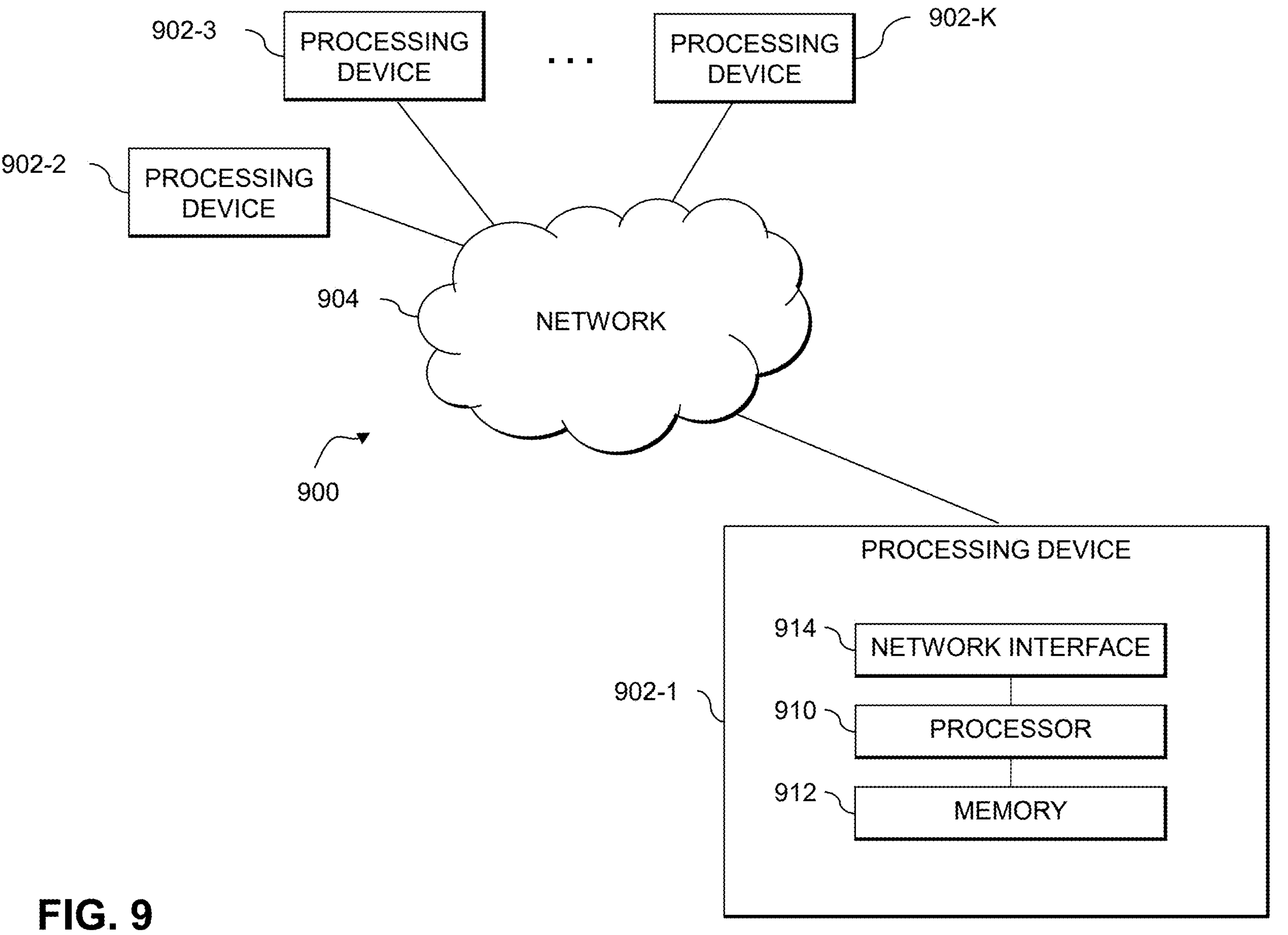

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 1000 in this embodiment comprises a portion of the information processing system 100 and includes a plurality of processing devices, denoted 902-1, 902-2, 902-3, . . . 902-K, which communicate with one another over a network 904.

The network 904 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 902-1 in the processing platform 900 comprises a processor 910 coupled to a memory 912.

The processor 910 comprises a microprocessor, a microcontroller, an application-specific integrated circuit (ASIC), a field-programmable gate array (FPGA) or other type of processing circuitry, as well as portions or combinations of such circuitry elements.

The memory 912 comprises random access memory (RAM), read-only memory (ROM) or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method for log anomaly detection across diverse log domains, comprising:

receiving, by a log anomaly detection system, log event sequences from a source domain;

pretraining, by the log anomaly detection system, a model to learn common patterns and semantics from the source domain log sequences;

implementing, by the log anomaly detection system, a Log-Attention Module to address information loss that occurs during log parsing;

performing, by the log anomaly detection system, adapter-based fine-tuning on the pretrained model using target domain log sequences; and detecting, by the log anomaly detection system, anomalies in the target domain log sequences using the fine-tuned model, wherein the method is implemented by at least one processing device comprising a processor coupled to a memory.

2. The method of claim 1 wherein pretraining the model comprises:

extracting features from the source domain log sequences using a pretrained language model.

3. The method of claim 1 pretraining the model comprises:

pretraining the model using a plurality of domain log sequences.

4. The method of claim 1 pretraining the model comprises:

acquiring shared semantic knowledge from the source domain.

5. The method of claim 1 pretraining the model comprises:

processing log event sequences through a feature extractor prior to the pretraining.

6. The method of claim 5 wherein the feature extractor comprises using neural network models to capture semantic information within log sequences.

7. The method of claim 1 wherein implementing the Log-Attention Module comprises:

integrating parameter and keyword information into a Transformer encoder, and applying a Log-Attention mechanism that introduces a bias term to capture additional context from log parameters and keywords.

8. The method of claim 7 wherein the Log-Attention mechanism is defined by the equation: $\mathrm{LogAttention}(Q,K,V,b)=\mathrm{softmax}((QK^T+b)/\sqrt{d_k})V$, where Q, K, and V are query, key, and value matrices respectively, and b is the bias term.

9. The method of claim 8 wherein the bias term is derived from parameter and keyword information present in the log data.

10. The method of claim 8 wherein the bias term is derived from a neural network.

11. The method of claim 8 wherein the bias term is a randomized number.

12. The method of claim 8 further comprising supplementing information lost during log parsing by integrating the parameter and keyword information into the Transformer encoder.

13. The method of claim 1 wherein performing adapter-based fine-tuning on the pretrained model comprises:

receiving log event sequences from a target domain;

processing the target domain sequences through an adapter layer; and fine-tuning the pretrained model using the adapter layer to adapt to the target domain while minimizing additional parameters.

14. The method of claim 13 wherein the adapter layer comprises lightweight layers added alongside main Transformer encoder layers.

15. The method of claim 13 wherein processing the target domain sequences through the adapter layer comprises:

extracting features from the target domain in a similar fashion as the source domain, additionally including the adapter layer.

16. The method of claim 1 wherein performing adapter-based fine-tuning on the pretrained model comprises:

implementing an adapter mechanism defined by: $\mathrm{Adapter}(x)=\mathrm{LayerNorm}(x+\mathrm{FeedForward}(x))$, where x is an input to the adapter.

17. The method of claim 1 wherein detecting anomalies in the target domain log sequences comprises:

utilizing both a Log-Attention mechanism and adapter-based features to identify irregular patterns in the target domain.

18. The method of claim 1 further comprising:

capturing sequential information of log events through a parallel adapter structure within the Log-Attention layer.

19. A system comprising:

at least one processing device comprising a processor coupled to a memory;

the at least one processing device being configured:

to receive, by a log anomaly detection system, log event sequences from a source domain;

to pretrain, by the log anomaly detection system, a model to learn common patterns and semantics from the source domain log sequences;

to implement, by the log anomaly detection system, a Log-Attention Module to address information loss that occurs during log parsing;

to perform, by the log anomaly detection system, adapter-based fine-tuning on the pretrained model using target domain log sequences; and to detect, by the log anomaly detection system, anomalies in the target domain log sequences using the fine-tuned model.

20. A computer program product comprising a non-transitory processor-readable storage medium having stored therein program code of one or more software programs, wherein the program code when executed by at least one processing device causes said at least one processing device:

to receive, by a log anomaly detection system, log event sequences from a source domain;

to pretrain, by the log anomaly detection system, a model to learn common patterns and semantics from the source domain log sequences;

to implement, by the log anomaly detection system, a Log-Attention Module to address information loss that occurs during log parsing;

to perform, by the log anomaly detection system, adapter-based fine-tuning on the pretrained model using target domain log sequences; and to detect, by the log anomaly detection system, anomalies in the target domain log sequences.

* * * * *